United States Patent
Noda

(10) Patent No.: US 10,523,840 B2
(45) Date of Patent: Dec. 31, 2019

(54) IMAGE PROCESSING APPARATUS, IMAGE PROCESSING METHOD, AND RECORDING MEDIUM

(71) Applicant: Yuichi Noda, Tokyo (JP)

(72) Inventor: Yuichi Noda, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 78 days.

(21) Appl. No.: 15/606,186

(22) Filed: May 26, 2017

(65) Prior Publication Data

US 2017/0358049 A1 Dec. 14, 2017

(30) Foreign Application Priority Data

Jun. 10, 2016 (JP) .................................. 2016-116549
Apr. 24, 2017 (JP) .................................. 2017-085657

(51) Int. Cl.
*H04N 1/32* (2006.01)
(52) U.S. Cl.
CPC .............................. *H04N 1/32144* (2013.01)
(58) Field of Classification Search
CPC .................................................. H04N 1/32144
See application file for complete search history.

(56) References Cited

U.S. PATENT DOCUMENTS

| | | | | |
|---|---|---|---|---|
| 2002/0105839 A1* | 8/2002 | Sugahara | ............... | G06T 1/0021 365/200 |
| 2004/0165081 A1* | 8/2004 | Shibaki | .................... | H04N 1/56 348/222.1 |
| 2004/0246294 A1* | 12/2004 | Mitsuzawa | ............... | B41J 2/145 347/23 |
| 2006/0182377 A1* | 8/2006 | Akamatsu | ............... | F16C 33/34 384/492 |
| 2008/0030750 A1* | 2/2008 | Kato | ...................... | G03G 21/02 358/1.4 |
| 2008/0080009 A1* | 4/2008 | Masui | .................. | G06T 1/0028 358/3.28 |
| 2010/0195123 A1* | 8/2010 | Fujioka | ................. | G06F 3/1207 358/1.9 |
| 2014/0168675 A1* | 6/2014 | Sato | ....................... | H04N 1/446 358/1.9 |
| 2014/0185070 A1* | 7/2014 | Muramoto | ......... | H04N 1/00278 358/1.9 |
| 2015/0356761 A1 | 12/2015 | Saitoh et al. | | |
| 2017/0041486 A1 | 2/2017 | Noda et al. | | |

FOREIGN PATENT DOCUMENTS

| | | |
|---|---|---|
| JP | 2004-529586 | 9/2004 |
| JP | 2007-028402 | 2/2007 |
| WO | WO2002/098140 A2 | 12/2002 |

* cited by examiner

*Primary Examiner* — King Y Poon
(74) *Attorney, Agent, or Firm* — Harness, Dickey & Pierce, P.L.C.

(57) ABSTRACT

An image processing apparatus includes circuitry that acquires first image data, embeds electronic watermark data in a brightness component of the first image data to generate second image data, and determines a type of the second image data based on a color difference component of the second image data.

14 Claims, 12 Drawing Sheets

FIG. 10A

| SIZE | NUMBER | PARAMETER |
|---|---|---|
| A4 | 1 | 0 |
| A3 | 2 | 5 |

| COLOR | NUMBER | PARAMETER |
|---|---|---|
| MONOCHROME | 1 | 0 |
| MONOTONE COLOR | 2 | 10 |
| TWO TONE COLOR | 3 | 20 |
| FULL COLOR | 4 | 30 |

| NUMBER OF SURFACES | NUMBER | PARAMETER |
|---|---|---|
| SIMPLEX | 1 | 0 |
| DUPLEX | 2 | 5 |

| SAVE TONER | NUMBER | PARAMETER |
|---|---|---|
| INVALID | 1 | 10 |
| VALID | 2 | 0 |

| USER | NUMBER | PARAMETER |
|---|---|---|
| GUEST | 1 | 20 |
| GENERAL USER | 2 | 10 |
| ADMINISTRATOR | 3 | 0 |

| BASE RATE | NUMBER | PARAMETER |
|---|---|---|
| 10 YEN | 1 | 10 |
| 5 YEN | 2 | 5 |

| TYPE NAME | NUMBER | PARAMETER |
|---|---|---|
| SIZE | 1 | 0 |
| COLOR | 4 | 30 |
| NUMBER OF SURFACES | 2 | 5 |
| SAVE TONER | 2 | 0 |
| USER | 2 | 10 |
| BASE RATE | 1 | 10 |
| CHARGE (YEN) | | 55 |

FIG. 12

$Y = 0.2989 \times R + 0.5866 \times G + 0.1145 \times B \cdots$ EQUATION 1
$Cb = 0.1687 \times R - 0.3312 \times G + 0.5000 \times B \cdots$ EQUATION 2
$Cr = 0.5000 \times R - 0.4183 \times G - 0.0816 \times B \cdots$ EQUATION 3

Y : VALUE OF BRIGHTNESS COMPONENT,
Cb : VALUE OF BLUE COLOR-DIFFERENCE COMPONENT,
Cr : VALUE OF RED COLOR-DIFFERENCE COMPONENT,
R : VALUE OF RED COMPONENT,
G : VALUE OF GREEN COMPONENT, B : VALUE OF BLUE COMPONENT

FIG. 13

R = Y + 0.000 × Cb + 1.402 × Cr ... EQUATION 4
G = Y − 0.34414 × Cb − 0.71414 × Cr ... EQUATION 5
B = Y + 1.772 × Cb + 0.000 × Cr ... EQUATION 6

K = min (255 − R, 255 − G, 255 − B) ... EQUATION 7
C = 255 − R − K ... EQUATION 8
M = 255 − G − K ... EQUATION 9
Ye = 255 − B − K ... EQUATION 10
CONSEQUENTLY
K = min (255 − (Y + 1.402 × Cr), 255 − (Y − 0.34414 × Cb − 0.71414 × Cr), 255 − (Y + 1.772 × Cb))
... EQUATION 11

C = 255 − (Y + 1.402 × Cr) − K ... EQUATION 12
M = 255 − (Y − 0.34414 × Cb − 0.71414 × Cr) − K ... EQUATION 13
Ye = 255 − (Y + 1.772 × Cb) − K ... EQUATION 14

Y : VALUE OF BRIGHTNESS COMPONENT,
Cb : VALUE OF BLUE COLOR-DIFFERENCE COMPONENT,
Cr : VALUE OF RED COLOR-DIFFERENCE COMPONENT,
R : VALUE OF RED COMPONENT,
G : VALUE OF GREEN COMPONENT, B : VALUE OF BLUE COMPONENT,
K : VALUE OF BLACK COMPONENT, C : VALUE OF CYAN COMPONENT,
M : VALUE OF MAGENTA COMPONENT, Ye : VALUE OF YELLOW COMPONENT

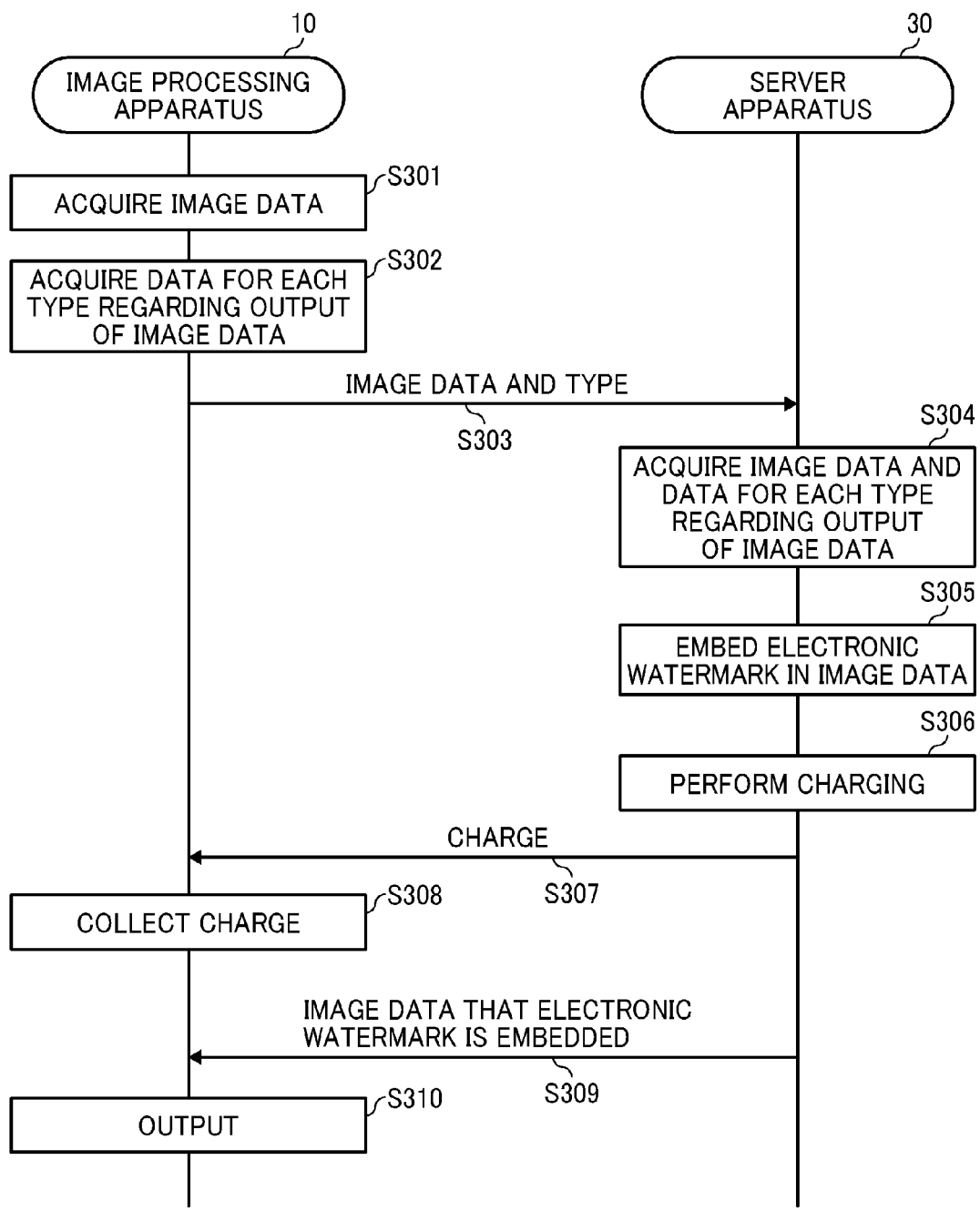

IMAGE PROCESSING APPARATUS, IMAGE PROCESSING METHOD, AND RECORDING MEDIUM

CROSS-REFERENCE TO RELATED APPLICATION

This patent application is based on and claims priority pursuant to 35 U.S.C. § 119(a) to Japanese Patent Applications No. 2016-116549, filed on Jun. 10, 2016, and No. 2017-085657, filed on Apr. 24, 2017 in the Japan Patent Office, the entire disclosure of which is hereby incorporated by reference herein.

BACKGROUND

Technical Field

The present invention relates to an image processing apparatus, an image processing method, and a non-transitory recording medium storing an image processing program.

Background Art

To prevent information on printed matter from leaking, the background image forming apparatuses embed electronic watermark data in image data to be printed.

For example, color profile data is embedded in image data as electronic watermark data without affecting visual appearance of the image data.

SUMMARY

Example embodiments of the present invention provide a novel image processing apparatus includes circuitry that acquires first image data, embeds electronic watermark data in a brightness component of the first image data to generate second image data, and determines a type of the second image data based on a color difference component of the second image data.

Further example embodiments of the present invention provide a method of processing an image and a non-transitory recording medium storing an image processing program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 10A to 10F are diagrams illustrating a charge table as an embodiment of the present invention;

FIG. 11 is a diagram illustrating operation of charging as an embodiment of the present invention;

FIG. 12 is a diagram illustrating an equation used for generating YCbCr image data as an embodiment of the present invention;

FIG. 13 is a diagram illustrating an equation used for generating CMYK image data as an embodiment of the present invention;

FIG. 17 is a sequence chart illustrating an operation performed by the image processing system as an embodiment of the present invention.

Figure 1:
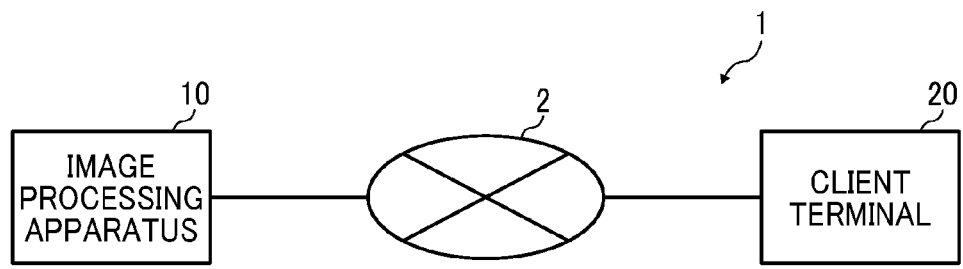
FIG. 1 is a diagram illustrating an image processing system as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted as needed.

First Embodiment

System Configuration

FIG. 1 is a diagram illustrating an image processing system in this embodiment. An image processing system 1 includes an image processing apparatus 10 and a client terminal 20. The image processing apparatus 10 is connected to the client terminal 20 via a network 2.

The client terminal 20 transfers image data to the image processing apparatus 10. The client terminal 20 requests the image processing apparatus 10 to output the image data. The request from the client terminal 20 includes a type of outputting the image data such as color printing or monochrome printing etc. In addition, the request may include a request to embed electronic watermark data in the image data.

The image processing apparatus 10 outputs the image data received from the client terminal 20 in accordance with the request from the client terminal 20. More specifically, the image processing apparatus 10 prints out the image data in accordance with the request.

The image processing apparatus 10 may accept a request from a user of the image processing apparatus 10, read image data, and print out the image data. In this case, the image processing apparatus 10 accepts a type of the output and a request to embed electronic watermark data etc. directly from the user.

Hardware Configuration

Figure 2:
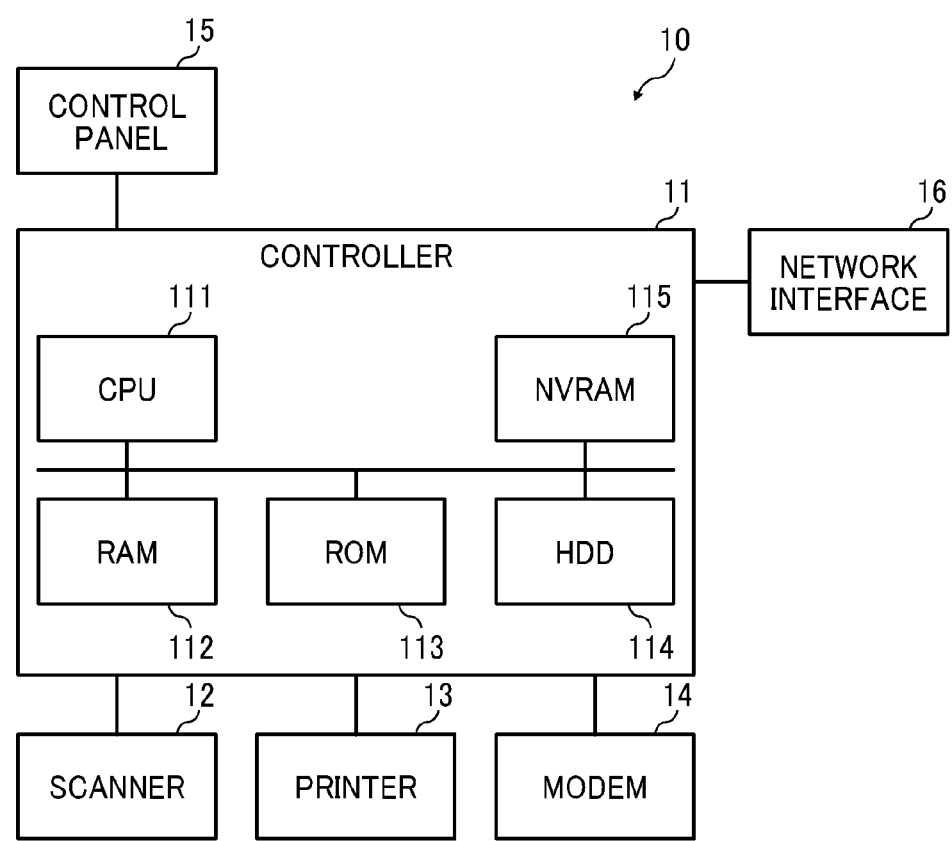
FIG. 2 is a block diagram illustrating a hardware configuration of an image processing apparatus as an embodiment of the present invention.

FIG. 2 is a block diagram illustrating a hardware configuration of the image processing apparatus 10 in this embodiment. In FIG. 2, the image processing apparatus 10 includes hardware such as a controller 11, a scanner 12, a printer 13, a modem 14, a control panel 15, and a network interface 16 etc. connected with each other via a bus.

The controller 11 includes a central processing unit (CPU) 111, a random access memory (RAM) 112, a read only memory (ROM) 113, a hard disk drive (HDD) 114, and a non-volatile random access memory (NVRAM) 115 etc. The ROM 113 stores various programs and data used by the programs etc. The RAM 112 is used as a storing area for loading a program and a work area for the loaded program etc. The CPU 111 implements various functions by executing the program loaded in the RAM 112. The HDD 114 stores programs and various data used by the programs etc. The NVRAM 115 stores various setting information etc.

The scanner 12 is hardware for scanning a paper document to generate image data. The printer 13 is hardware for printing print data on printing paper. The modem 14 is hardware for connecting to a telephone network and exchanging image data using facsimile communication. The control panel 15 is hardware including input devices such as buttons for accepting inputs by user operation and display devices such as a liquid crystal panel etc. The liquid crystal panel may include a touch panel function. In this case, the liquid crystal panel also includes a function of an input device. The network interface 16 is hardware for connecting to a wired/wireless network such as a local area network (LAN) etc.

Configuration of Software Module

A configuration of a software module in the image processing apparatus 10 is described below with reference to FIG. 3.

Figure 3:
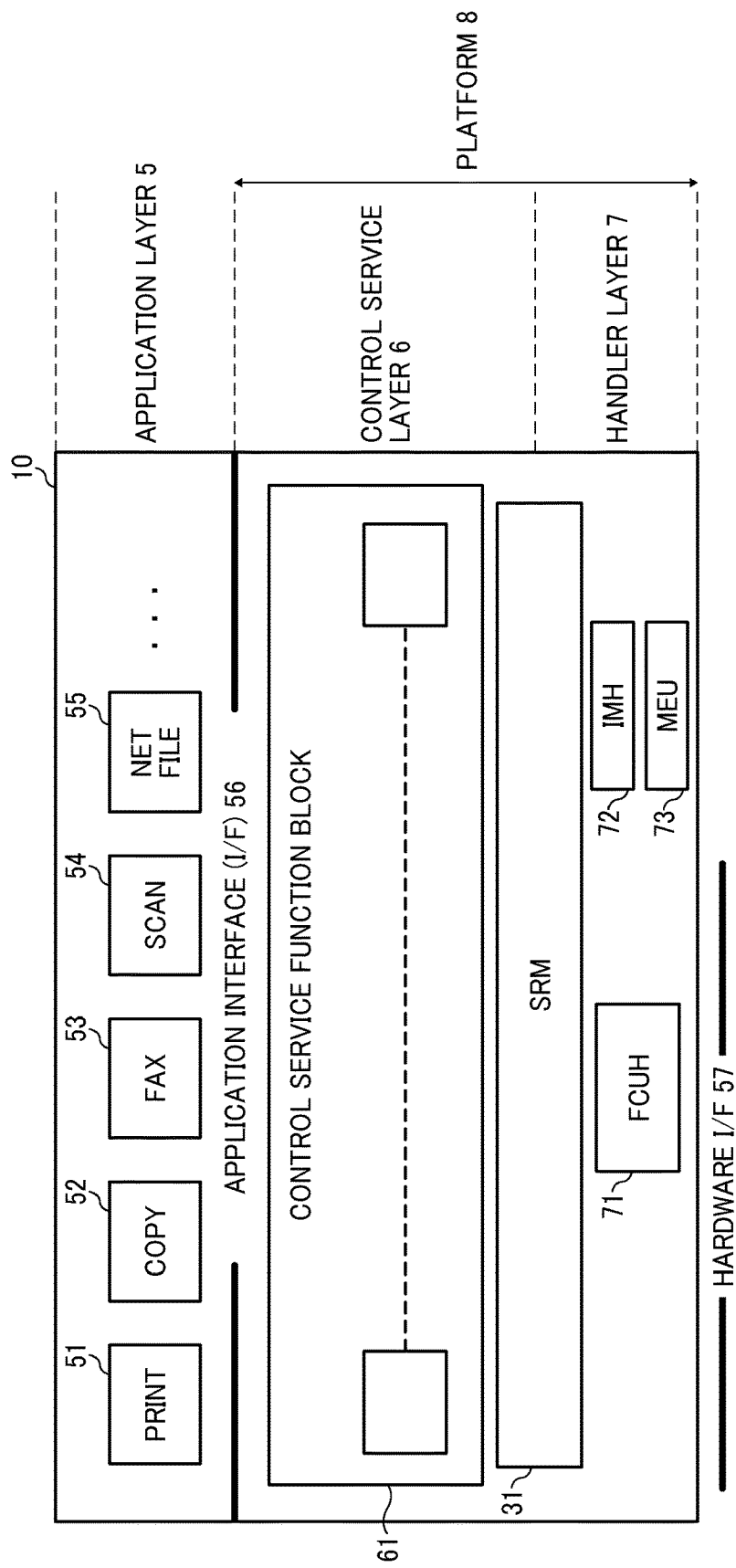
FIG. 3 is a block diagram illustrating a software configuration of the image processing apparatus of FIG. 2 as an embodiment of the present invention.

FIG. 3 is a block diagram illustrating a software configuration of the image processing apparatus 10 in this embodiment.

The software in the image processing apparatus 10 includes a hierarchical structure consisting of an application layer 5 and a platform 8. The platform 8 includes a control service layer 6 and a handler layer 7.

In the application layer 5, a software module regarding an application provided by the image processing apparatus 10 is installed. In FIG. 3, in the application layer 5, a print module (PRINT 51), a copy module (COPY 52), a facsimile module (FAX 53), a scan module (SCAN 54), and a net file module (NET FILE 55) etc. are installed. Here, the net file module is a software module used for storing document data and image data etc. in a server etc. connected to the network 2.

In the control service layer 6, a module 61 used for implementing functions provided by the application layer 5 in cooperation with hardware is installed. The module 61 receives a request for processing from the application layer via an application interface (I/F) 56 and allocates a hardware resource in accordance with the request for processing.

A system resource manager (SRM) 31 arbitrates requests for allocating hardware resources received from the module in the control service layer 6.

In the handler layer 7, modules 71 to 73 that manage hardware resources are installed. The modules 71 to 73 in the handler layer 7 operate hardware such as a printer etc. via a hardware I/F 57. In FIG. 3, a Fax Control Unit Handler (FCUH) 71 and an Image Memory Handler (IMH) 72, and a MEU 73 are installed as modules in the hander layer 7. Here, the MEU 73 controls embedding electronic watermark and converting images.

The software modules described above may be operated by executing one or more programs stored in the ROM etc. by the CPU.

Functional Configuration

Next, descriptions are given below of a functional configuration of the image processing apparatus 10 according to the present embodiment with reference to FIG. 4.

Figure 4:
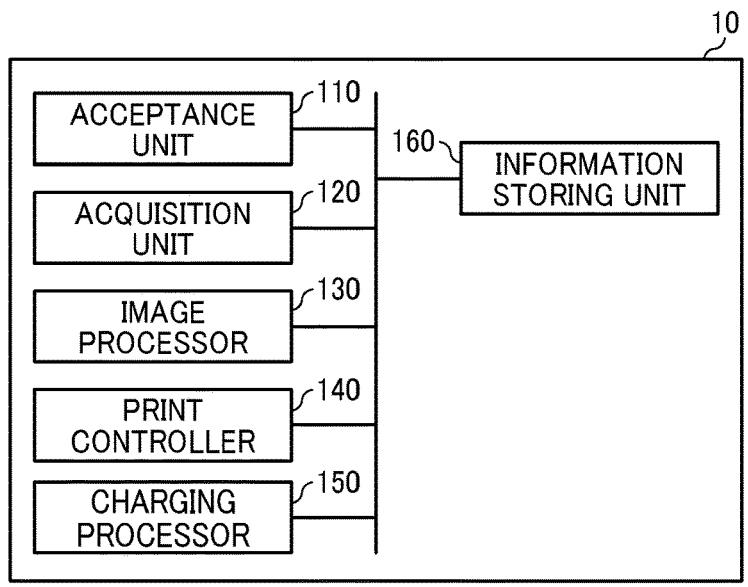
FIG. 4 is a diagram illustrating a functional configuration of the image processing apparatus of FIG. 2 as an embodiment of the present invention.

FIG. 4 is a diagram illustrating a functional configuration of the image processing apparatus 10 in this embodiment. The image processing apparatus 10 includes an acceptance unit 110, an acquisition unit 120, an image processor 130, a print controller 140, and a charging processor 150. These functional units may be implemented by reading one or more programs stored in the ROM 113 etc. and executing the programs by the CPU 111. In addition, the image processing apparatus 10 includes an information storing unit 160. For example, the information storing unit 160 may be implemented by the HDD 114.

The acceptance unit 110 accepts various requests from the user of the image processing apparatus 10.

The acquisition unit 120 acquires image data to be printed out from the client terminal 20. The acquisition unit 120 acquires image data scanned by the scanner 12.

The image processor 130 performs an image processing operation on the image data acquired by the acquisition unit 120. More specifically, mage processor 130 generates Red Green Blue (RGB) data for the acquired image data (first image data).

In case of receiving a request to embed electronic watermark in the image data, the image processor 130 performs YCbCr conversion on the RGB image data and generates YCbCr image data. Here, in the YCbCr conversion, the RGB image data indicated by lightness of each color red (R), green (G), and blue (B) is converted into the YCbCr image data indicated by brightness (Y) and color differences (i.e., Ch is blue color difference and Cr is red color difference). Here, Cb indicates hue and chroma for colors in blue color system, and Cr indicates hue and chroma for colors in red color system. Subsequently, the image processor 130 embeds electronic watermark data in the brightness (Y) component and generates Y'CbCr image data (second image data) that the electronic watermark data is embedded. It should be noted that the YCbCr image data is an example of data that includes the brightness component and the two color difference components, and the image processor 130 may use formats such as YUV and YPbPr etc. instead of the YCbCr format. It should be noted that, if the two color difference components in the image data have no values, the image data is a monochrome image.

The image processor 130 performs CMYK conversion on the image data and generates image data to be printed out (CMYK image data). In this case, CMYK format is a printable format, and the image processor 130 converts the format of the original image data into the printable format.

The print controller 140 controls the printer 13 to print out the CMYK image data. The charging processor 150 determines a type of the image data to be printed out and performs a charging operation in accordance with the type of the image data. For example, the charging processor 150 determines whether the type of color of the image data is monochrome (achromatic color) or color (chromatic color) etc.

If no value is set to the color difference components (Cb and Cr) of the second image data (i.e., the value is almost 0), the charging processor 150 determines that monochrome image data is to be printed and performs the charging operation in accordance with monochrome printing.

Otherwise, if a value is set to the color difference components (Cb and Cr) of the second image data (i.e., the value is not almost 0) and a value is set to any one of the cyan (C) component, the magenta (M) component, and the yellow (Y) component only, the charging processor 150 may determine that the type of the image data to be printed is monotone color.

Otherwise, if a value is set to the color difference components (Cb and Cr) of the second image data and a value is set to any two of the cyan (C) component, the magenta (NI) component, and the yellow (Y) component, the charging processor 150 may determine that the type of the image data to be printed is two tone color.

Otherwise, if a value is set to the color difference components (Cb and Cr) of the second image data and a value is set to the three components, the cyan (C) component, the magenta (M) component, and the yellow (Y) component, the charging processor 150 may determine that the type of the image data to be printed is full color.

The information storing unit 160 stores various information. For example, in response to commands received from the image processor 130 and the acquisition unit 120, the information storing unit 160 stores the first image data, RGB image data, YCbCr image data, the second image data and CMYK image etc. The information storing unit 160 stores electronic watermark data. In addition, the information storing unit 160 stores the type of output of image data and a charge rate (parameter) to be applied associated with each other in the charge table 161.

Figure 5:
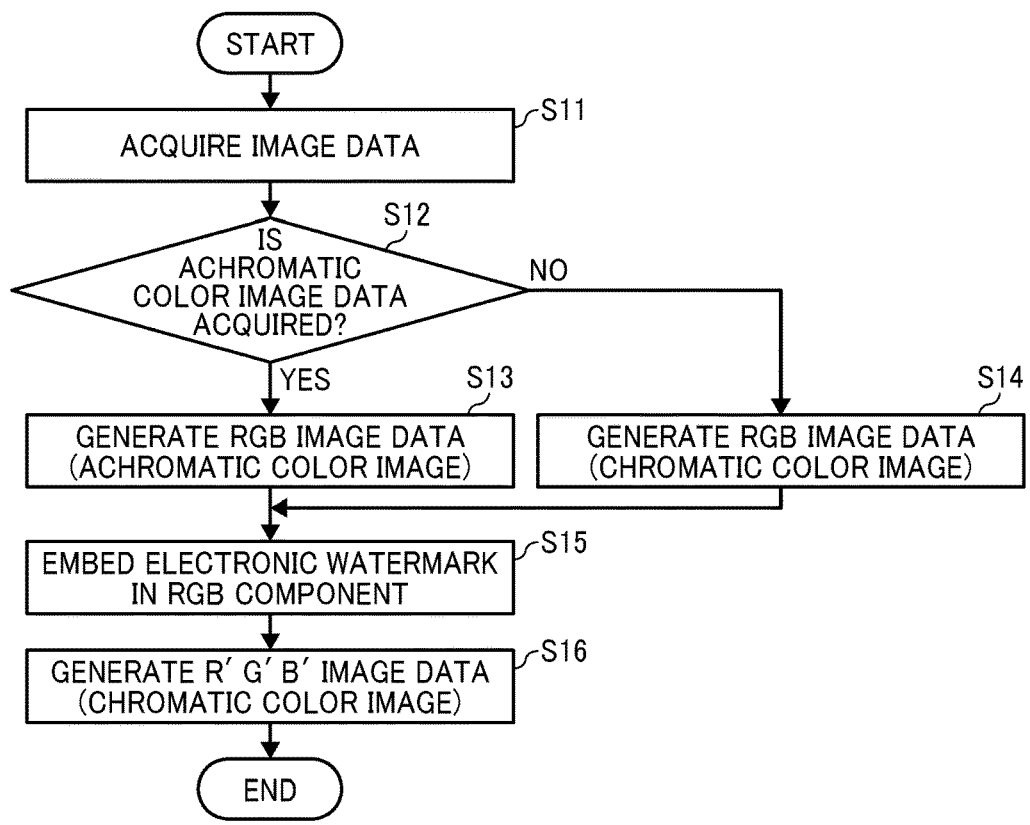
FIG. 5 is a flowchart illustrating operation of embedding electronic watermark data as an embodiment of the present invention.

Operations of embedding electronic watermark data and charging performed by the image processing apparatus 10 are described below with reference to FIGS. 5 and 6. First, an operation of embedding electronic watermark data is described below with reference to FIG. 5.

In S11, the image processing apparatus 10 scans an image and acquires image data.

In S12, the image processing apparatus 10 determines whether or not the acquired image data is achromatic color. If the image data is achromatic color (YES in S12), the operation proceeds to S13. By contrast, if the image data is not achromatic color (NO in S12), the operation proceeds to S14.

In S13, the image processing apparatus 10 generates achromatic RGB image data.

In S14, the image processing apparatus 10 generates chromatic RGB image data.

In S15, the image processing apparatus 10 embeds electronic watermark data in the RGB image data.

In S16, the image processing apparatus 10 generates image data (R'G'B' image data) that electronic watermark data is embedded in the RGB image data. Here, the electronic watermark data is embedded in each of the red component, the green component, and the blue component. As a result, the generated R'G'B' image data is chromatic image data.

Figure 6:
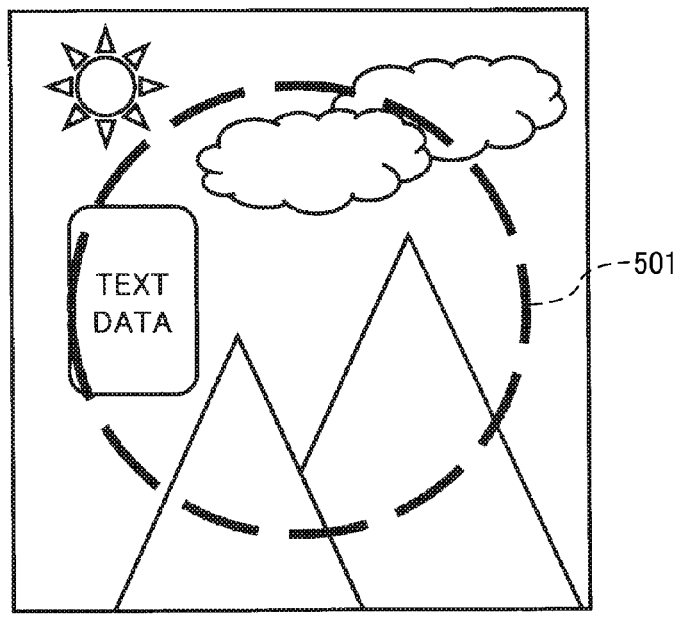
FIG. 6 is a diagram illustrating an image that electronic watermark data is embedded as an embodiment of the present invention.

FIG. 6 is a diagram illustrating an image that the electronic watermark data is embedded in this embodiment. In FIG. 6, a circle 501 indicated by a dash line is embedded as electronic watermark. For example, a color that is hardly viewable by a user such as yellow etc. is set to the circle 501. It should be noted that information etc. of the original data such as a location where data is stored etc. is indicated by the circle 501.

As described above, after embedding the general electronic watermark data, the chromatic image data is generated even if the achromatic image data is scanned. In the above description, the case that the image data is scanned is described. However, similar operation may be adopted if the image data is acquired from the client terminal 20.

Figure 7:
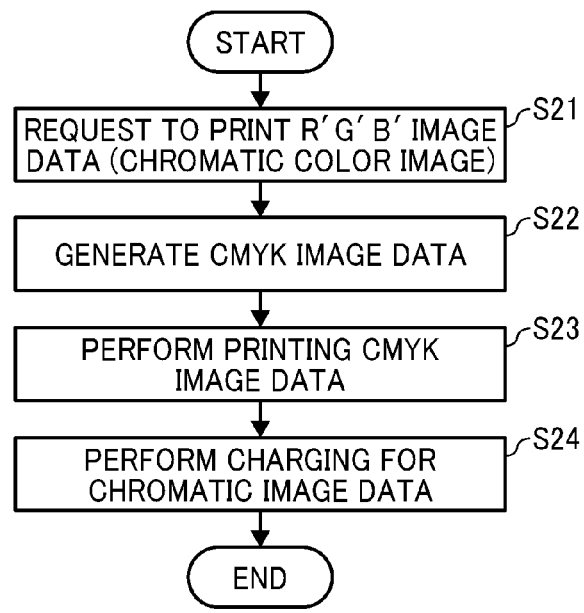
FIG. 7 is a flowchart illustrating operation of charging as an embodiment of the present invention.

Next, an operation of charging is described below with reference to FIG. 7.

In S21, the image processing apparatus 10 accepts a request to print out the R'G'B' image data.

In S22, the image processing apparatus 10 performs CMYK conversion on the R'G'B' image data and generates CMYK image data, Here, the R'G'B' image data is chromatic image data. Therefore, the CMYK image data is also chromatic image data.

In S23, the image processing apparatus 10 prints out the CMYK image data.

In S24, the image data to be printed out is chromatic image data. Therefore, the image processing apparatus 10 performs the charging operation on the chromatic image data.

As described above, even if the acquire image data is achromatic, the image data that the electronic watermark data is embedded is chromatic. Therefore, the charging operation for chromatic color is applied to the image data to be printed out.

Next, operations of embedding electronic watermark data and charging in this embodiment are described below with reference to FIGS. 8 and 9.

Figure 8:
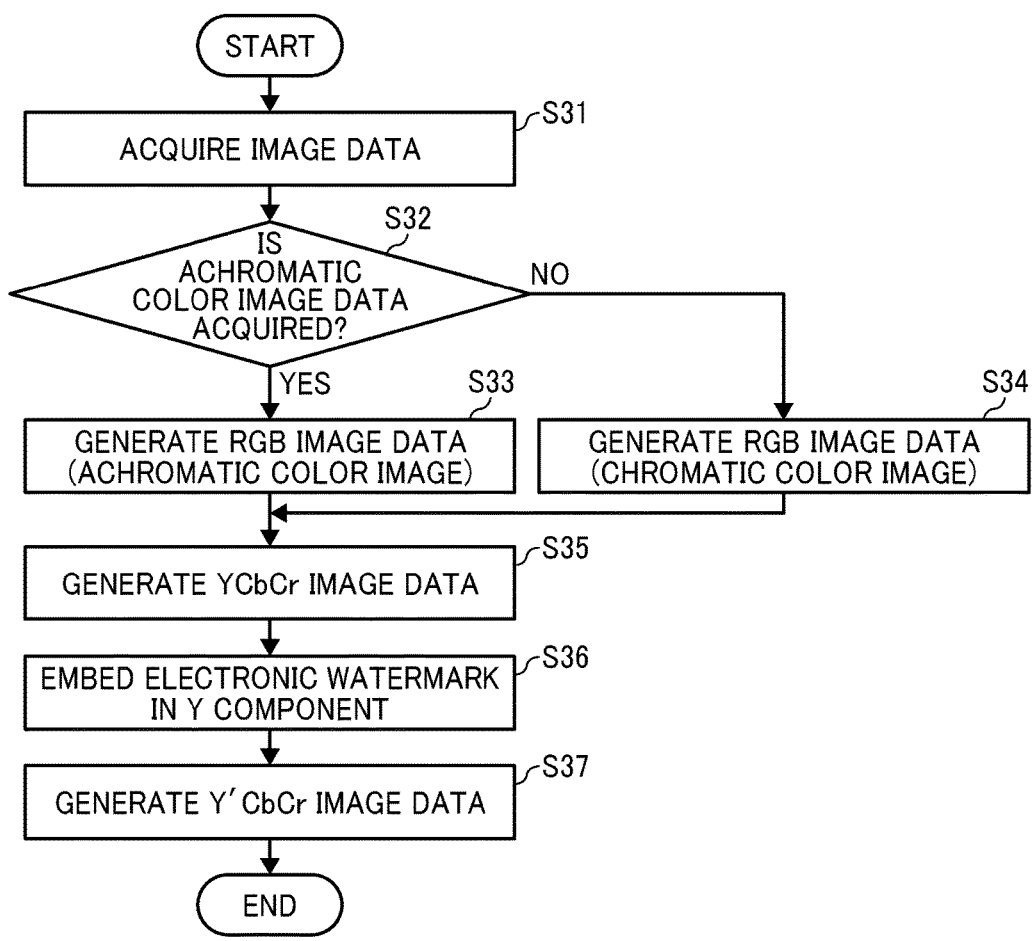
FIG. 8 is a flowchart illustrating operation of embedding as an embodiment of the present invention.
Figure 9:
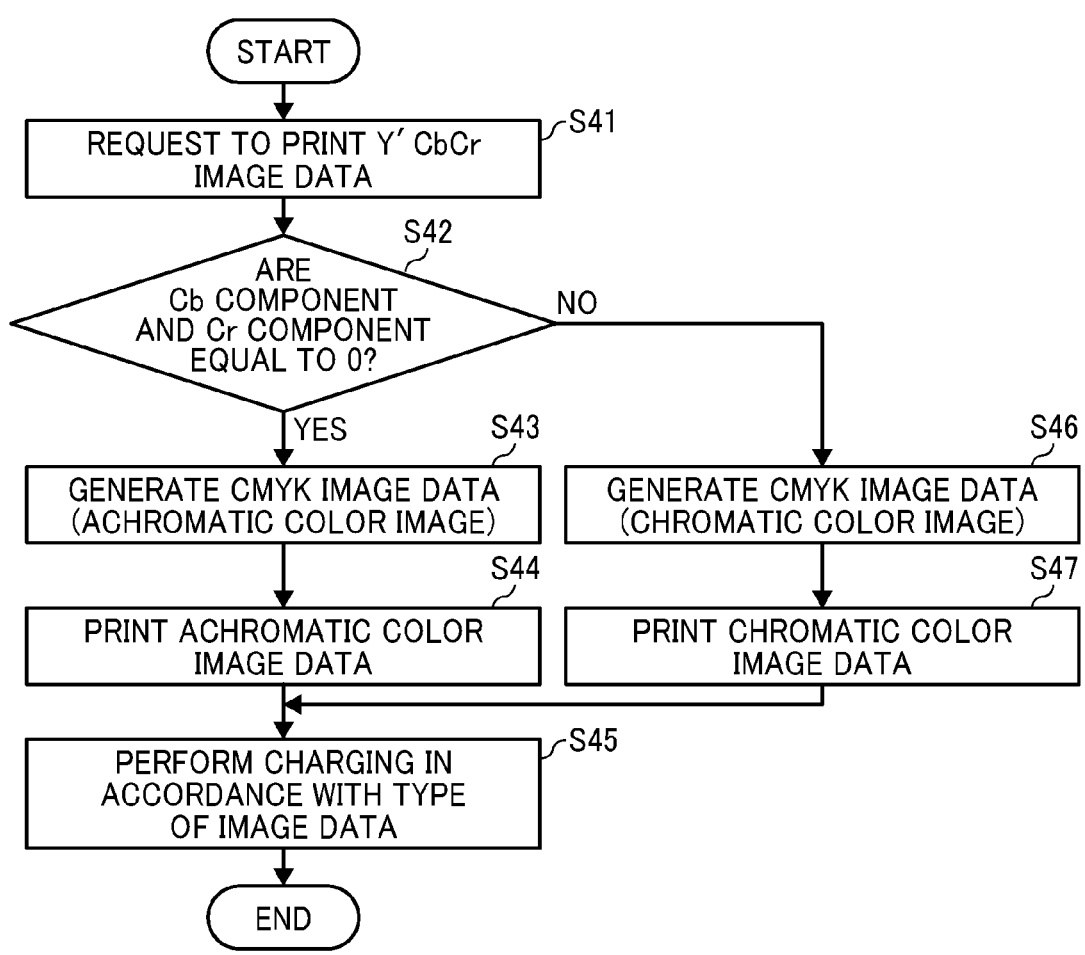
FIG. 9 is a flowchart illustrating operation of embedding as an embodiment of the present invention.

FIG. 8 is a diagram illustrating an operation of embedding electronic watermark data in this embodiment.

In S31, the acquisition unit 120 acquires image data. The acquisition unit 120 may acquire image data scanned by the scanner 12. Otherwise, the acquisition unit 120 may acquire image data from the client terminal 20.

In S32, the acquisition unit 120 determines whether or not the image processor 130 acquires achromatic image data. If the achromatic image data is acquired (YES in S32), the operation proceeds to S33. By contrast, if the achromatic image data is not acquired (NO in S32), the operation proceeds to S34.

In S33, the image processor 130 generates achromatic RGB image data. Here, the generated image data is stored in the information storing unit 160.

In S34, the image processor 130 generates chromatic RGB image data. There, the generated image data is stored in the information storing unit 160.

In S35, the image processing 130 performs an operation of YCbCr conversion on the RGB image data and generates YCbCr image data. Here, if the operation of YCbCr conversion is performed on the achromatic RGB image data, values of color difference components Cb and Cr are equal to 0. By contrast, if the operation of YCbCr conversion is performed on the chromatic RGB image data, values of color difference components Cb and Cr are not equal to 0.

In S36, the image processor 130 embeds electronic watermark in the generated YCbCr image data. Here, the image processor 130 performs the operation of embedding electronic watermark on the Y (brightness) component in the YCbCr image data.

In S37, the image processor 130 performs the operation of embedding electronic watermark on the Y (brightness) component in the YCbCr image data. As a result, the second image data (Y'CbCr image data) is generated. Here, the brightness value for each pixel is indicated by an integer value 0 to 255. After embedding electronic watermark data in each pixel, the brightness value for each pixel is modified. Here, in the image that the electronic watermark data is embedded in FIG. 6, in this embodiment, in the circle 501 drawn by the dash line, tone values white to black are configured using two values white and black or the brightness value 0 to 255, for example.

Next, an operation of charging in this embodiment is described below with reference to FIG. 9.

In S41, the image processing apparatus 10 starts printing out the second image data.

In S42, the charging processor 150 determines whether or not both the Cb component and the Cr component in the second image data are equal to 0. If both the Cb component and the Cr component are equal to 0 (YES in S42), the operation proceeds to S43. If both the Cb component and the Cr component are not equal to 0 (NO in S42), the operation proceeds to S46.

In S43, the image processor 130 performs an operation of CMYK conversion on the second image data and generates CMYK image data. The CMYK image data generated in this case is achromatic image data.

In S44, the print controller 140 prints out the CMYK image data, i.e., achromatic image data.

In S45, the charging processor 150 performs the charging operation in accordance with the type of output image data with reference to the charge table 161, and the operation ends.

In S46, the image processing 130 performs an operation of CMYK conversion on the second image data and generates CMYK image data. The CMYK image data generated in this case is chromatic image data.

In S47, the print controller 140 prints out the CMYK image data, i.e., chromatic image data. Subsequently, the operation proceeds to the charging operation in S45.

Next, the charging operation in S45 is described below with reference to FIGS. 10A to 10F.

FIGS. 10A to 10F are diagrams illustrating the charge table 161 in this embodiment. In charge tables 161A to 161F illustrated in FIGS. 10A to 10F, respectively, charges (parameters) are configured in accordance with the type value regarding output image data such as size, color, number of surfaces, toner save application, user, and base rate etc. It should be noted that data stored in the charge table 161 may be configured preliminarily.

The size is a size of printed paper, and values such as "A4" and "A3" etc. are configured for example. The color is data regarding color to be printed, and values such as "monochrome", "monotone color", "two tone color", and "full color" etc. are configured for example. The number of surfaces indicates the number of surfaces to be printed, and values such as "simplex" and "duplex" etc. are configured for example. For example, the charging processor 150 determines the number of toner colors such as C, M, Y, and K used for printing CMYK image data. If one toner color other than K is used, the charging processor 150 determines as "monotone color". If two toner colors are used, the charging processor 150 determines as "two tone color". If more than three toner colors are used, the charging processor 150 determines as "full color".

"Save toner" is data indicating whether or not the image data is printed using a mode that reduces toner consumption in the printing operation.

"User" is a value indicating an attribute of a user who requests to print out the image data or an attribute of a user (including corporation etc.) who owns ownership or access authority of the image data to be printed. For example, the attribute of the user who requests to print out the image data is acquired by inputting user ID or scanning an employee card on the image processing apparatus 10.

For example, the ownership or access authority of the image data to be printed is acquired from the electronic watermark embedded in the image processor 130. As a result, the type of the image data may be determined on the basis of the electronic watermark data embedded in the image data, and the charging operation in accordance with the determined type may be performed.

It should be noted that, if the access authority of the image data to be printed is configured, a printable area by the print controller 140 may be modified in accordance with the attribute of the user who requests to print out the image data. For example, if the attribute of the user who requests to print out the image data is "administrator", all objects in the image data may be printed out. If the attribute of the user who requests to print out the image data is "guest", only the image object in the image data may be printed out.

"Base rate" is a base rate per one printing configured in each image processing apparatus 10 for example.

It should be noted that the item "number" in FIGS. 10A to 10F is identification information on values in each type.

FIG. 11 is a diagram illustrating a charging operation in this embodiment. In FIG. 11, charges in cases such as the size is "A4" (number "1" in FIG. 10A) and the color is "full color" (number "3" in FIG. 10B) etc. are illustrated. In FIG. 11, charges in accordance with types are summed, and the charge is determined as 55 yen.

In the operations described above, even if the electronic watermark is embedded in the achromatic image data, the image data is not considered as the chromatic image data. Therefore, it is possible to perform the appropriate charging operation on the achromatic image data.

For example, if it is determined that both the Cb component and the Cr component in the second image data are equal to 0 (YES in S42), the charging processor 150 determines that the image data is achromatic and performs the charging operation on the achromatic image data.

For example, if it is determined that both the Cb component and the Cr component in the second image data are not equal to 0 (NO in S42) and a value is set to any one of the cyan (C) component, the magenta (M) component, the yellow (Y) component, and the black (K) component, the charging processor 150 may determine that the image data is monotone color and performs the charging operation on the monotone image data. It should be noted that, if a value is set to the K component only in this case, the charging processor 150 determines the image data as achromatic and performs the charging operation on the achromatic image data.

For example, if it is determined that both the Cb component and the Cr component in the second image data are not equal to 0 (NO in S42) and a value is set to any two of the cyan (C) component, the magenta (M) component, the yellow (Y) component, and the black (K) component, the charging processor 150 may determine that the image data is two tone color and performs the charging operation on the two tone image data. Otherwise, if values are set to all components, the charging processor 150 determines the image data as full color and performs the charging operation on the full color image data.

It should be noted that, in the embodiment described above, the image processing apparatus 10 performs the CMYK conversion and generates the CMYK image data. However, it is possible to perform a conversion operation using values of other color components. For example, in case of using white toner, a conversion operation that calculates a value of a white component may be performed.

The operation of generating the YCbCr image data from the RGB image data may be implemented by adopting the generating operation as described below, or any other desired know operation.

For example, by applying equations 1 to 3 illustrated in FIG. 12 to each pixel in the RGB image data, YCbCr image data may be generated.

Here, in case of achromatic image data, values of the R component, the G component, and the B component are equal, and values of the Cb component and the Cr component are equal to 0.

In addition, likewise, the operation of generating the CMYK image data from the YCbCr image data may be implemented by adopting the generating operation as described below, or any other desired known operation.

For example, by applying equations 4 to 14 illustrated in FIG. 13 to each pixel in the YCbCr image data, CMYK image data may be generated.

More specifically, by applying equations 4 to 6 to each pixel in the YCbCr image data, RGB image data may be generated. In addition, by applying equations 7 to 10 to each pixel in the RGB image data, CMYK image data may be generate& As a result, by applying equations 11 to 14 to each pixel in the YCbCr image data, CMYK image data may be generated.

It should be noted that, in equations 1 to 14 in FIGS. 12 and 13, in order to distinguish between the Y (brightness) component and the Y (yellow) component, the Y (brightness) component is indicated as Y, and the Y (yellow) component is indicated as Ye.

Second Embodiment

In the first embodiment, the case that the electronic watermark is embedded in the brightness component regardless of whether the original image to be printed out is monochrome or color is described. In this embodiment, if the original image to be printed out is monochrome, the electronic watermark is embedded in the brightness component, and if the original image to be printed out is color, the electronic watermark is embedded in the RGB component using a predetermined color. As a result, for example, the electronic watermark may be embedded using a color that is relatively not noticeable on the color image. Some parts of this embodiment are similar to the first embodiment. Therefore, descriptions for those parts are omitted appropriately. Specifically, the image processing apparatus 10 of the second embodiment is substantially similar in hardware structure to the image processing apparatus 10 according to the first embodiment, except that the image processing apparatus 10 performs operation of FIG. 14. For this reasons, description of its hardware structure is omitted.

Operations

Figure 14:
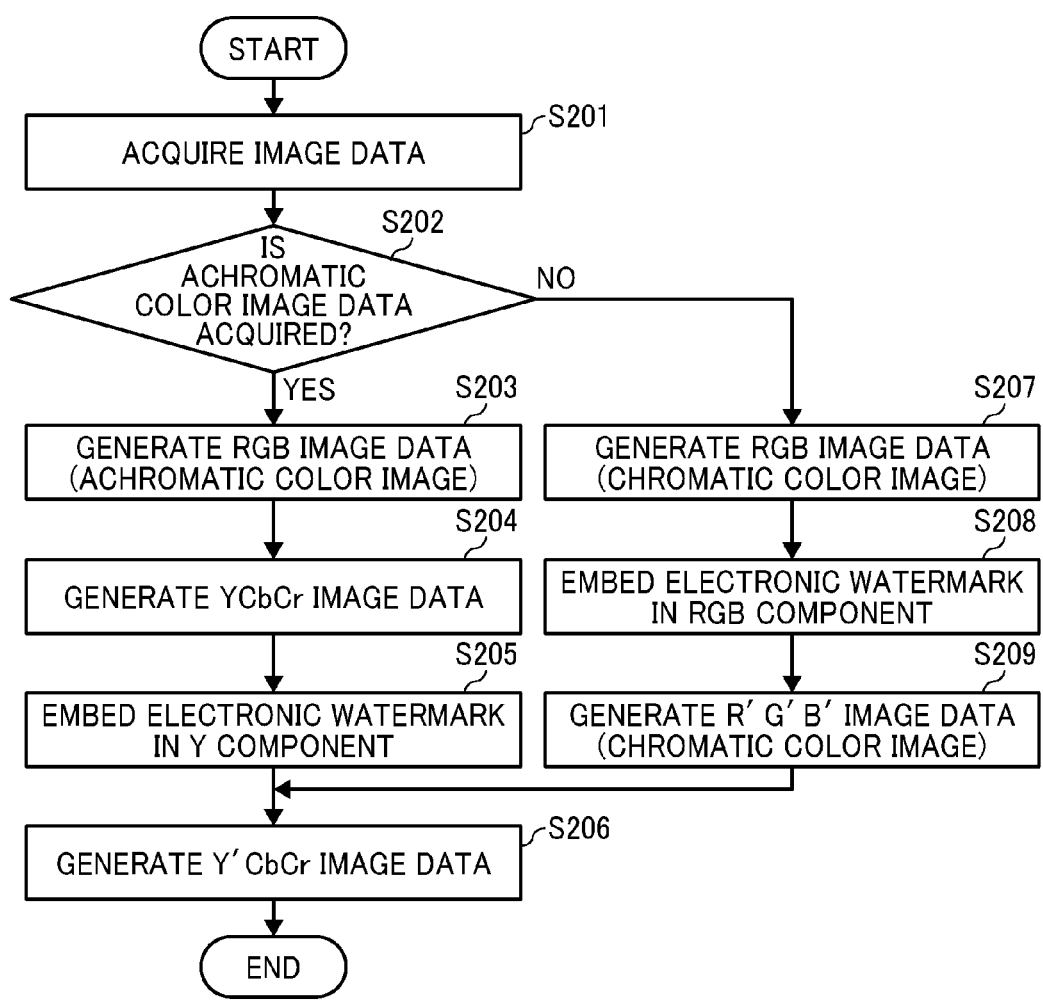
FIG. 14 is a diagram illustrating an operation of embedding electronic watermark data as an embodiment of the present invention.

FIG. 14 is a diagram illustrating an operation of embedding electronic watermark data in this embodiment. Steps S201 to S206 are similar to steps S31 to S33 and S35 to S37 in FIG. 8 in the first embodiment.

In S202, the acquisition unit 120 determines whether or not the image processor 130 acquires achromatic image data. If the achromatic image data is not acquired (NO) in S202), the operation proceeds to S207.

In S207, the image processor 130 generates chromatic RGB image data.

Next, in S208, the image processor 130 embeds the electronic watermark in the RUB component using a predetermined color (such as yellow etc.). That is, the electronic watermark is embedded in the brightness component and the color difference component in the chromatic RGB image data.

Next, in S209, the image processor 130 generates image data (R'G'B' image data) that electronic watermark data is embedded in the RGB image data, and the operation proceeds to S206. As a result, the YCbCr image data is generated from the RGB image data that the electronic watermark is embedded. Consequently, even if the original image to be printed is color, the printing operation and charging operation similar to FIG. 9 may be performed.

Third Embodiment

In the first embodiment and the second embodiment, the case that the image processing apparatus 10 performs the operations of embedding electronic watermark and charging etc. is described. In this embodiment, a case that at least some part of the operations of embedding electronic watermark and charging etc. are performed by an external apparatus is described. As a result, a server is able to manage the electronic watermark data and charge data in an integrated manner, thus reducing burden on the image processing apparatus 10 etc. Some parts of this embodiment are similar to the first embodiment and the second embodiment. Therefore, descriptions for those parts are omitted appropriately. Specifically, the image processing apparatus 10 of the third embodiment is substantially similar in hardware structure to the image processing apparatus 10 according to the first embodiment. For this reasons, description of its hardware structure is omitted.

System Configuration

Figure 15:
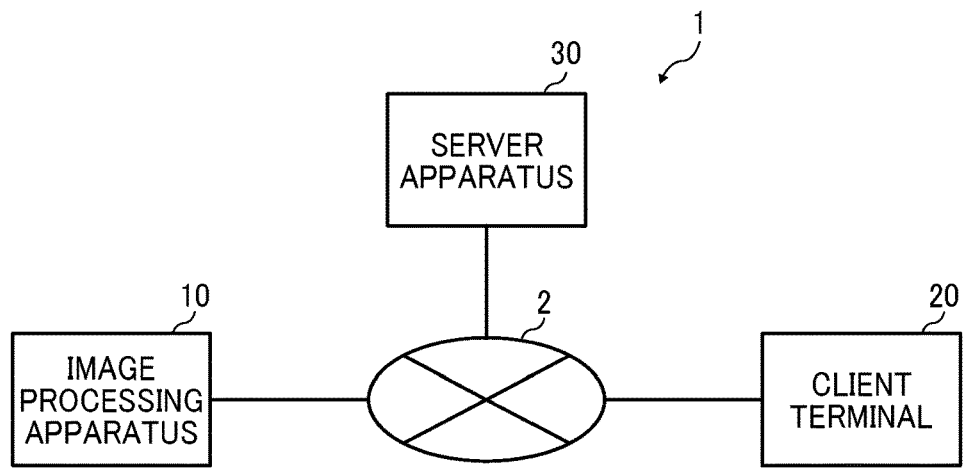
FIG. 15 is a diagram illustrating an image processing system as an embodiment of the present invention.

FIG. 15 is a diagram illustrating an image processing system in this embodiment. In this embodiment, the image processing system 1 further includes a server apparatus 30. The image processing apparatus 10 is connected to the server apparatus 30 via the network 2.

The server apparatus 30 performs at least some part of the operations of embedding electronic watermark and charging etc. in accordance with a request from the image processing apparatus 10.

It should be noted that the hardware configuration of the server apparatus 30 may be similar to a generic computer or similar to the controller 11 illustrated in FIG. 2 for example.

Functional Configuration

Next, descriptions are given below of a functional configuration of the server apparatus 30 according to the present embodiment with reference to FIG. 16.

Figure 16:
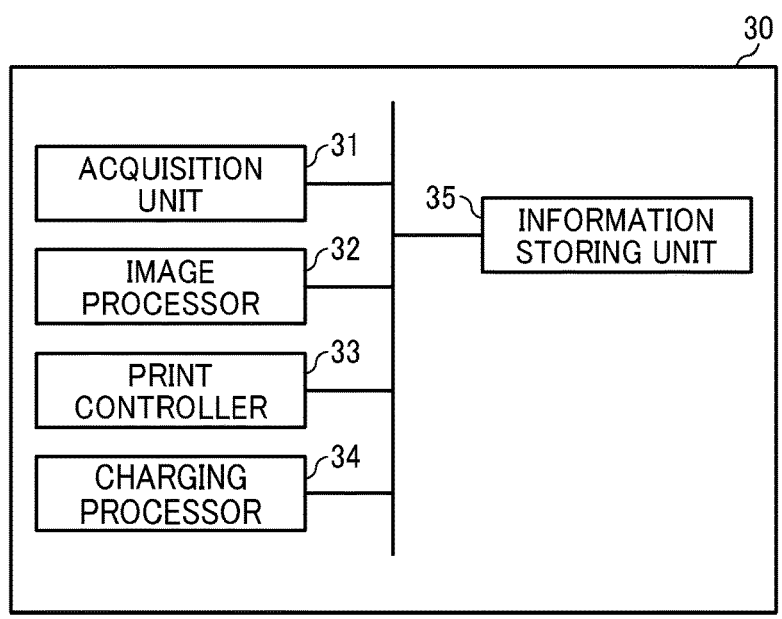
FIG. 16 is a diagram illustrating a functional configuration of a server apparatus as an embodiment of the present invention.

FIG. 16 is a diagram illustrating a functional configuration of the server apparatus 30 in this embodiment. The server apparatus 30 includes an acquisition unit 31, an image processor 32, a print controller 33, and a charging processor 34. These functional units may be implemented by reading one or more programs stored in the ROM etc. and executing the programs by the CPU. In addition, the server apparatus 30 includes an information storing unit 35. For example, the information storing unit 35 may be implemented by the HDD.

The acquisition unit 31 acquires image data etc.

The image processor 32 embeds electronic watermark in the image data acquired by the acquisition unit 31.

The print controller 33 controls printing operation performed by the image processing apparatus 10.

The charging processor 34 calculates charge on the basis of data on various types regarding output of the image data.

The information storing unit 35 stores various information. For example, the information storing unit 35 stores the charge table 161.

Operations

Next, with reference to FIG. 17, an operation performed by the image processing system 1 in this embodiment is described below FIG. 17 is a sequence chart illustrating an operation performed by the image processing system in this embodiment.

In S301, the image processing apparatus 10 acquires image data from the client terminal 20 or the scanner 12.

Next, in S302, the image processing apparatus 10 acquires data for the type regarding output of the image data. Here, the image processing apparatus 10 acquires the type value regarding output image data such as size, color, number of surfaces, save toner, user, and base rate etc. in the charge tables 161A to 161F illustrated in FIGS. 10A to 10F respectively on the basis of user operation for example.

Next, in S303, the image processing apparatus 10 transfers the image data and the data for the type regarding output of the image data to the server apparatus 30.

Next, in S304, the acquisition unit 31 in the server apparatus 30 receives the image data and the data for the type regarding output of the image data from the image processing apparatus 10.

Next, in S305, the image processor 32 in the server apparatus 30 embeds electronic watermark in the image data.

Next, in S306, the charging processor 34 in the server apparatus 30 performs the charging operation in the basis of the charge tables 161A to 161F illustrated in FIGS. 10A to 10F stored in the information storing unit 35 and the data for the type regarding output of the image data acquired by the acquisition unit 31.

Next, in S307, the charging processor 34 in the server apparatus 30 transfers information regarding the charge calculated by the charging operation to the image processing apparatus 10. Here, the charging processor 34 requests the image processing apparatus 10 to perform an operation of collecting the calculated charge from the user.

Next, in S308, the image processing apparatus 10 collects the calculated charge from the user. For example, the image processing apparatus 10 may collect charge using coins, electronic money, and credit card etc.

Next, in S309, the print controller 33 in the server apparatus 30 transfers the image data that the electronic watermark is embedded to the image processing apparatus 10. Subsequently, the print controller 33 controls the printer 13 in the image processing apparatus 10 and commands the printer 13 to print out the image data that the electronic watermark is embedded.

Next, in S310, the image processing apparatus 10 requests the printer 13 to output the image data that the electronic watermark is embedded.

In the embodiments described above, the electronic watermark data is embedded in the brightness component of the image data, and the type of the image data is determined on the basis of the color difference component. As a result, it is possible to appropriately determine the type of the image data to be printed out.

In known technologies, in some cases, in the image processing apparatuses etc., in printing out the image data, a charge rate is applied in accordance with the type of the image data. For example, a charge rate for color printing is applied in printing color image data, and a charge rate for monochrome printing is applied in printing monochrome image data. In this case, in known technologies, if the electronic watermark data is embedded in the monochrome image data, in some cases, due to the embedded electronic watermark data, the monochrome image data is wrongly determined as the color image data, and the charge rate for color printing is applied.

By contrast, in the embodiments described above, it is possible to apply the appropriate charge rate to the image data that the electronic watermark data is embedded.

The image processors 130 and 32 are an example of a generator. The charging processors 150 and 34 are an example of a determination unit (determining unit). The print controller 140 and the printer 13 are an example of a printer. The image processing apparatus 10 and the server apparatus 30 are an example of an image processing apparatus.

A recording medium that stores a software program code for implementing the functional units described above may be supplied for the image processing apparatus 10. In this case, the embodiments described above may obviously be implemented by reading and executing the program code stored in the storage medium by the image processing apparatus 10. In this case, the program code itself read from the recording medium implements the functional units in the embodiments described above, and the recording medium that stores the program code constructs any one of the embodiments described above. Here, the recording medium is a recording medium or a nontemporary recording medium.

The embodiments described above provide the image processing apparatus that may determine the type of the image data to be printed out.

It should be noted that the case that the computer apparatus reads and executes the program code is just one example to implement the functional units in the embodiments described above. In addition, in accordance with instructions by the program code, an operating system (OS) running on the computer apparatus may perform a part of the operations or all operations. Furthermore, the functional units described in the above embodiments may obviously be implemented by performing those operations.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image processing apparatuses using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image processing apparatus, comprising:
memory storing computer-readable instructions; and
one or more processors configured to execute the computer-readable instructions such that the one or more processors are configured to perform operations including,
acquiring first image data;
generating second image data having a brightness component and two color difference components from the acquired first data;
embedding digital watermark data in the brightness component of the second image data to generate third image data;
determining whether the third image data is monochrome image data or color image data, based on a color difference component between color systems of the third image data; and
performing monochrome printing based on the third image data when the third image data is determined as the monochrome image data, and performing color printing when the third image data is determined as the color image data.

2. The image processing apparatus according to claim 1, wherein the one or more processors are configured to acquire the first image data read by a scanner disposed for the image processing apparatus or the first image data transmitted from a client terminal connected to the image processing apparatus.

3. The image processing apparatus according to claim 1, wherein the one or more processors are further configured to embed the digital watermark data in the brightness component of the second image data by changing a brightness value of the second image data without changing a value of the color difference component of the second image data.

4. The image processing apparatus according to claim 1, wherein the one or more processors are further configured to determine that the third image data is color image data if a value of the color difference component of the third image data is not equal to 0.

5. The image processing apparatus according to claim 1, wherein the one or more processors are further configured to determine a number of toner colors used for printing the third image data if a value of the color difference component of the third image data is not equal to 0.

6. The image processing apparatus according to claim 1, wherein the one or more processors are further configured to
embed the digital watermark data in the brightness component of the second image data if the one or more processors determines that the second image data is monochrome color, and
embed the digital watermark data in the color difference component of the second image data if the one or more processors determines that the second image data is not monochrome color.

7. The image processing apparatus according to claim 1, wherein the one or more processors are further configured to determine a type of the third image data based on the digital watermark data being embedded.

8. The image processing apparatus according to claim 1, wherein the one or more processors are further configured to calculate a charge for printing the third image data based on a type of the third image data being determined.

9. An image processing system, comprising:
the image processing apparatus according to claim 1; and
a server apparatus.

10. A method of processing an image performed by an image processing apparatus, the method comprising:
acquiring first image data;
generating second image data having a brightness component and two color difference components from the acquired first data;
embedding digital watermark data in the brightness component of the second image data to generate third image data;
determining whether the third image data is monochrome image data or color image data, based on a color difference component of the third image data; and
performing monochrome printing based on the third image data when the third image data is determined as the monochrome image data, and performing color printing when the third image data is determined as the color image data.

11. A non-transitory, computer-readable recording medium storing a program that, when executed by one or more processors of an image processing apparatus, causes the processors to implement a method of processing an image, comprising:
   acquiring first image data;
   generating second image data having a brightness component and two color difference components from the acquired first data;
   embedding digital watermark data in a brightness component of the t second image data to generate third image data;
   determining whether the third image data is monochrome image data or color image data, based on a color difference component of the third image data; and
   performing monochrome printing based on the third image data when the third image data is determined as the monochrome image data, and performing color printing when the third image data is determined as the color image data.

12. The image processing apparatus according to claim 1, wherein the type of output of image data is at least one of paper size, color, number of surfaces, toner save application, user, and a charge rate.

13. The image processing apparatus according to claim 1, wherein the one or more processors are further configured to convert the third image data to print data and output the print data to a printer.

14. The image processing apparatus according to claim 1, wherein the color difference component includes a difference in a YCbCr component of the third image data.

* * * * *